United States Patent
Kim

(10) Patent No.: US 11,814,477 B2
(45) Date of Patent: Nov. 14, 2023

(54) ALKYD POLYMER COMPOSITIONS AND PRODUCT FORMULATIONS FORMED THEREFROM

(71) Applicant: Arkema Inc., King of Prussia, PA (US)

(72) Inventor: Kyu-Jun Kim, Cary, NC (US)

(73) Assignee: Arkema Inc., King of Prussia, PA (US)

(*) Notice: Subject to any disclaimer, the term of this patent is extended or adjusted under 35 U.S.C. 154(b) by 258 days.

(21) Appl. No.: 16/331,168

(22) PCT Filed: Aug. 25, 2017

(86) PCT No.: PCT/US2017/048546
§ 371 (c)(1),
(2) Date: Mar. 7, 2019

(87) PCT Pub. No.: WO2018/048638
PCT Pub. Date: Mar. 15, 2018

(65) Prior Publication Data
US 2020/0181323 A1 Jun. 11, 2020

Related U.S. Application Data

(60) Provisional application No. 62/384,239, filed on Sep. 7, 2016.

(51) Int. Cl.
| | |
|---|---|
| C08G 63/672 | (2006.01) |
| C08G 81/02 | (2006.01) |
| C09D 11/105 | (2014.01) |
| C09D 11/30 | (2014.01) |
| C09D 15/00 | (2006.01) |
| C09D 167/08 | (2006.01) |
| C09J 167/08 | (2006.01) |
| C09K 3/10 | (2006.01) |

(52) U.S. Cl.
CPC ......... *C08G 63/672* (2013.01); *C08G 81/027* (2013.01); *C09D 11/105* (2013.01); *C09D 11/30* (2013.01); *C09D 15/00* (2013.01); *C09D 167/08* (2013.01); *C09J 167/08* (2013.01); *C09K 3/10* (2013.01); *C09K 2200/0655* (2013.01)

(58) Field of Classification Search
CPC .... C09D 167/08; C09D 11/105; C09D 11/30; C09D 15/00; C08G 63/668; C08G 63/672; C08G 81/027; C09J 167/08; C09K 2200/0655; C09K 3/10
See application file for complete search history.

(56) References Cited

U.S. PATENT DOCUMENTS

| | | | |
|---|---|---|---|
| 2,954,355 A | 9/1960 | Yuong et al. | |
| 3,238,161 A | 3/1966 | Jenkins et al. | |
| 3,481,892 A | 12/1969 | Huang et al. | |
| 3,952,032 A * | 4/1976 | Vrancken | C08F 20/20 560/127 |
| 4,418,174 A | 11/1983 | Dhein et al. | |
| 5,530,059 A | 6/1996 | Blount, Jr. et al. | |
| 5,959,066 A | 9/1999 | Charbonneau et al. | |
| 6,063,464 A | 5/2000 | Charbonneau et al. | |
| 6,469,096 B1 | 10/2002 | Urbano et al. | |
| 6,489,398 B1 | 12/2002 | Zuckert et al. | |
| 2010/0041821 A1 * | 2/2010 | Eslinger | C09D 167/08 524/539 |
| 2014/0155514 A1 | 6/2014 | Lansbergen | |
| 2015/0031828 A1 | 1/2015 | Roussel et al. | |

FOREIGN PATENT DOCUMENTS

| | | |
|---|---|---|
| WO | WO 99/38926 | 8/1999 |
| WO | WO 2015/077677 A1 | 5/2015 |

OTHER PUBLICATIONS

"Making Alkyd Resins? Try sorbitol for unique effects", Atlas Powder Company, Canada, LTD., Brantford, Ontario, Canada; C&EN Feb. 20, 1956 (Year: 1956).*
Krzysztof Manczyk et al "Highly branched high solids alkyd resins" Progress in Organic Coatings 44 (2002) 99-109 (Year: 2002).*
J. Van Haveren, et al., J. Coat. Technol. Res., 4 (2) pp. 177-186, 2007 "Resins and Additives for Powder Coatings and Alkyd Paints, Based on Renewable Resources".
X. Yin, et al., Progress in Organic Coatings, 77,pp. 674-678 (2014) "An Investigation on Synthesis of Alkyd Resin with Sorbitol".

(Continued)

*Primary Examiner* — Frances Tischler
*Assistant Examiner* — Gennadiy Mesh
(74) *Attorney, Agent, or Firm* — Lynn B. Morreale

(57) ABSTRACT

An alkyd polymer composition for use in low volatile organic compound (VOC) containing products that exhibits a Gardner-Holdt viscosity with 30 weight % mineral spirits at 25° C. that is less than or equal to Z4, a thy-hard time of less than 10 hours when tested with metal driers according to ASTM D 1640-03, and a clear appearance. The alkyd polymer composition includes, as polymerized units an alkyd polymer of one or more fatty acids; a sugar alcohol having at least 6 carbon atoms; a polyol with four or more hydroxyl functional groups; and an aromatic polyacid with two carboxylic acid groups located in a meta-position relative to one another. The alkyd polymer composition includes at least one aliphatic oxide ring having one or more peaks located between 75 to 90 ppm as measured using $C^{13}$ Nuclear Magnetic Resonance (NMR) spectroscopy.

14 Claims, 3 Drawing Sheets

(56) References Cited

OTHER PUBLICATIONS

D. Bagchi and R.K. Malakar, Journal of Coatings Technology, 58 (740), pp. 51-57 (1986).
K. Hajek, "Farbe und Lack", 83,pp. 798-804 (1977).
Trahanosky, W.S., et al, Isosorbide esters ; enantiopure alcohols derived from glucose » 223rd National Meeting of the ACS, Orlando, FL, Fuel Chemistry Division Preprints, Apr. 7-11, 2002, vol. 47, Issue 1, pp. 368-369.
ASTM Standard Test Methods for Drying, Curing or Film Formation of Organic Coatings at Room Temperature D1640-03, Sep. 2012, retrieved from internet http://editorbar.com.

* cited by examiner

*After polymerization*

*Before polymerization*

2-Rings  1-Ring

ALKYD POLYMER COMPOSITIONS AND PRODUCT FORMULATIONS FORMED THEREFROM

CROSS-REFERENCE TO RELATED APPLICATIONS

This application is a national stage application under 35 U.S.C. § 371 of PCT/US2017/48546 filed Aug. 25, 2017, which claims benefit to U.S. patent application Ser. No. 62/384,239, filed Sep. 7, 2016.

FIELD OF THE INVENTION

This disclosure relates generally to alkyd polymers. More specifically, this disclosure relates to alkyd polymers that exhibit a fast dry-hard time and maintain a clear appearance.

BACKGROUND OF THE INVENTION

The statements in this section merely provide background information related to the present invention and may not constitute prior art.

The continuing environmental pressure from various regulatory authorities mandates the coating industry adopt lower volatile organic compound (VOC) products to minimize harmful volatiles entering the environment. In order to comply with tightening VOC regulations, the coating industry has adopted (i) the use of waterborne alkyd products (i.e., water-borne alkyd dispersions and/or alkyd emulsions), (ii) the use of high solids solvent-borne alkyd products, and (iii) the use of exempt solvents in conventional solvent-borne paints. However, each of these technologies has advantages and disadvantages.

Waterborne alkyd products lack the ability to displace all solvent-borne technology, especially for field applied applications where substrates cleanliness and environmental curing conditions are less than ideal. For these applications, either high solids products or conventional high VOC solvent-borne alkyd products that utilize exempt solvents are preferred.

Exempt solvents, such as para-chlorobenzotrifluoride, acetone, dimethyl carbonate, t-butylacetate, are typically used to achieve VOC compliance. However, these solvents provide challenges for incorporation into an alky product due to their cost, as well as odor, flash point, and solubility characteristics. Since no exempt solvent exhibits ideal characteristics, the coating industry tries to minimize the use of these solvents through the use of alkyd resins that exhibit lower viscosity.

In order to lower the viscosity of the alkyd resin, one may lower the molecular weight of the alkyd resin, increase the fatty acid amount, build a highly branched polymer structure, or achieve a narrow molecular weight distribution. However, decreasing the molecular weight of the alkyd resin or using high levels of a fatty acid may affect the performance of the coating negatively. On the other hand, building a highly branched polymer structure and achieving narrow molecular weight distribution always require high cost raw materials and the use of an unpractically long process. Thus these approaches are often not considered viable for the preparation of commercial low VOC alkyd products with reasonable raw material and processing costs.

An article by X. Yin, et al., published in *Progress in Organic Coatings*, 77, 674-678 (2014) teaches the alkyd polymer composition that is produced with soya fatty acid, phthalic anhydride, and sorbitol. The resulting polymer is stated to exhibit similar performance to conventional alkyds in adhesion, flexibility, scratch resistance, impact, water resistance, alkali resistance, acid resistance, and brine resistance.

An article by D. Bagchi and R. K. Malakar, published in *Journal of Coatings Technology*, 58 (740), 51-57 (1986) teaches an alkyd polymer composition produced with linseed oil, pentaerythritol, sorbitol, and phthalic anhydride. The resulting polymer is stated to exhibit equivalent properties to glycerol or pentaerythritol modified alkyd resins.

An article by K. Hajek. published in *Farbe and Lack*, 83, 798-804 (1977) teaches an alkyd polymer composition produced with soybean oil, pentaerythritol, sorbitol, and phthalic anhydride.

SUMMARY OF THE INVENTION

The present invention generally provides an alkyd polymer composition for use in low volatile organic compound (VOC) containing products. The alkyd polymer composition comprises, consists essentially of, or consists of, as polymerized units, an alkyd polymer of 15 to 75 wt. % of one or more fatty acids; 5 to 35 wt. % of a sugar alcohol having at least 6 carbon atoms; 2 to 10 wt. % of a polyol with four or more hydroxyl functional groups; and 5 to 25 wt. % of an aromatic polyacid with two or more carboxylic acid groups located in a meta-position relative to one another. The alkyd polymer composition has a clear appearance and a Gardner-Holdt viscosity with 30 weight % mineral spirits at 25° C. that is less than or equal to Z4; alternatively, greater than or equal to Z2; alternatively between Z and Z2. The alkyd polymer composition exhibits a dry-hard time of less than 10 hours, alternatively, less than 4 hours, when tested with metal driers according to ASTM D1640-03. The alkyd polymer composition comprises at least one aliphatic oxide ring having one or more peaks located between 75 to 90 ppm measured using $C^{13}$ Nuclear Magnetic Resonance (NMR) spectroscopy. When desirable, the alkyd polymer composition has a number average molecular weight between 500 and 100,000 Daltons.

According to one aspect of the present disclosure, sugar alcohol is selected as one from the group of sorbitol, mannitol, galactitol, fucitol, iditol, inositol, or a combination thereof. The fatty acid may be unsaturated, saturated, or a mixture thereof. Several examples of the fatty acids, include but are not limited to, dehydrated castor oil fatty acid, soybean oil fatty acid, tall oil fatty acid, sunflower fatty acid, coconut fatty acid, castor oil fatty acid, linseed oil fatty acid, tung oil fatty acid, safflower fatty acid, lineloic acid, or a mixture thereof.

According to another aspect of the present disclosure, the polyol with four or more hydroxyl functional groups is pentaerythitrol, dipentaerythritol, or a mixture thereof. The aromatic polyacid with at least two carboxylic acid groups located in the meta-position relative to one another is isophthalic acid, trimellitic anhydride, trimellitic acid, 5-(sodiosulfo)-isophthalic acid, pyromellitic dianhydride, or a mixture thereof.

According to yet another aspect of the present disclosure, the alkyd polymer composition may further comprise, as part of the polymerized units, one or more acrylic polymers, vinyl polymers, or mixtures thereof. The alkyd polymer composition may also comprises an organic carrier selected from the group consisting of a drying oil, an organic solvent, a varnish, a lacquer, a resin solution, an enamel, or an oil-based paint. When desirable, the organic solvent may be selected from, but are not limited to, mineral spirits, naphtha, methyl amyl ketone, xylene, toluene, methyl isobutyl ketone, ethyl acetate, diethylene glycol monobutyl ether acetate, ethylene glycol monobutyl ether acetate, dipropylene glycol monobutyl ether acetate, propylene glycol monobutyl ether acetate, ethylene glycol monobutyl ether, isobutyl acetate, n-propyl acetate, ethylene glycol monopropyl ether, ethyl 3-ethoxypropionate, n-butyl propionate, dipropylene glycol monobutyl ether, triethylene glycol monobutyl ether, methyl isoamyl ketone, oxo-hexyl acetate, tripropylene glycol monomethyl ether, aromatic hydrocarbon, prpylne gly phenyl ether, diethylene glycol monomethyl ether, diethylene glycol monoethyl ether acetate, isophorone, methyl propyl ketone, n-butyl acetate, propylene glycol monomethyl ether, para-chlorobenzotrifluoride, acetone, dimethyl carbonate, acetone, t-butylacetate or a mixture thereof.

According to another aspect of the present disclosure, a product formulation for use as a coating, a paint, an adhesive, a sealant, or an ink, is provided that comprises, consists of, or consists essentially of the alkyd polymer composition as described above and further defined herein. The product formulation may further comprise one or more additives selected from the group of additional polymers, pigments or colorants, fillers, dispersants or surfactants, plasticizers, defoamers, thickeners, biocides, solvents, rheology modifiers, wetting or spreading agents, leveling agents, conductive additives, thermal insulating filler, adhesion promoters, anti-blocking agents, anti-cratering agents or anti-crawling agents, corrosion inhibitors, anti-static agents, flame retardants, optical brighteners, UV absorbers or other light stabilizers, chelating agents, crosslinking agents, flattening agents, flocculants, humectants, insecticides, lubricants, odorants, oils, waxes or anti-slip aids, soil repellants, and stain resistant agents.

This product formulation may be used outdoors or indoors in a transportation application, an industrial application, a construction application, or a residential application. For example, the product formulation may be selected, without limitation, as one from the group of a general metal coating, rail car coating, agricultural machinery coating, automobile parts coating, log cabin coating, wood stain, porch or deck stain, glossy topcoat, traffic paint, kitchen cabinetry coating, automobile refinish, lawn & garden equipment coating, bus and truck top coating, gloss trim enamel, metal primer, light duty maintenance coating, furniture coating, stain blocking coating, appliance coating, dumpster coating, heavy duty equipment coating, industrial equipment coating, and sash and trim enamel.

According to another aspect of the present disclosure, a method of using a product formulation is provided. This method generally comprises, consists of, or consists essentially of the steps of providing the product formulation according to any of the above claims; applying the product formulation to the surface of a substrate; and allowing the product formulation to dry and adhere to the surface of the substrate. This product formulation exhibits a Gardner-Holdt viscosity at 25° C. that is less than or equal to Z4 and a dry-hard time of less than 10 hours with metal drier(s) when tested according to ASTM D1640-03.

In this method, the product formulation may be applied to the surface of the substrate using one or more processes selected from the group of dip coating, brush or roller coating, flow coating, curtain coating, ink jet, streaming, or spray coating. The substrate may be selected, without limitation, as one from the group of natural wood, fabricated wood, paper, cardboard, textiles, synthetic resins, ceramics, ferrous metals, non-ferrous metals, stone, concrete, blacktop, glass, plaster, or a mixture thereof.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
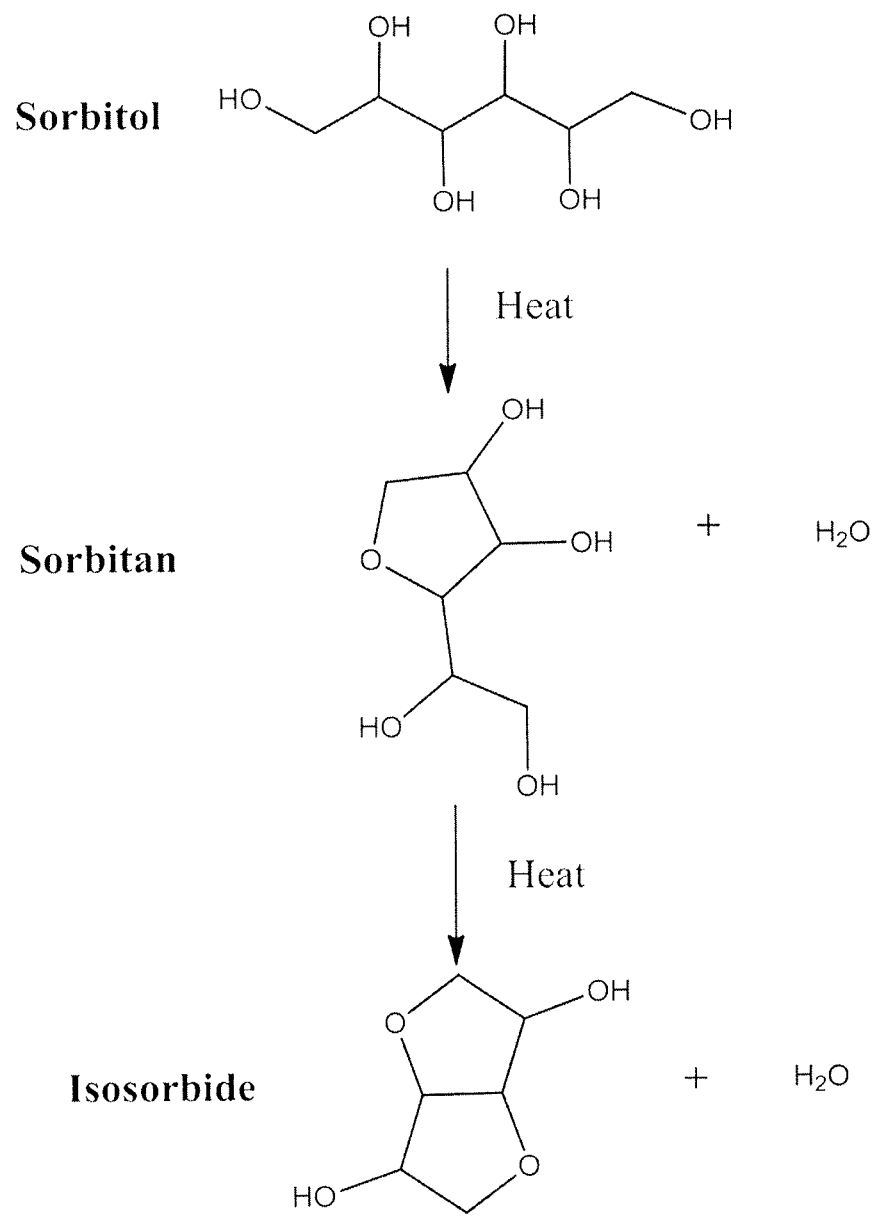
FIG. 1 is a schematic representation of the dehydration reaction that occurs with sorbitol upon being subjected to heat.

The following description is merely exemplary in nature and is in no way intended to limit the present disclosure or its application or uses. For example, the alkyd polymer composition made and used according to the teachings contained herein is described throughout the present disclosure in conjunction with coatings in order to more fully illustrate the composition and the use thereof. The incorporation and use of such an alkyd polymer composition in other applications, low volatile compound (VOC) containing products, or the like, are contemplated to be within the scope of the present disclosure. It should be understood that throughout the description, corresponding reference numerals indicate like or corresponding parts and features.

This disclosure generally relates to the alkyd polymer composition that exhibits a fast dry-hard time and a clear appearance. This alkyd polymer composition may be used in low volatile compound (VOC) containing products. The alkyd polymer composition comprises, consists of, or consists essentially of an alkyd polymer that includes as polymerized units one or more fatty acids, a sugar alcohol having at least six carbon atoms, a polyol with more than four hydroxyl functional groups, and an aromatic polyacid with two or more carboxylic groups located in a meta-position relative to one another. Such alkyd polymer compositions may be produced by using conventional polymerization techniques. These alkyd polymer compositions do not require high cost raw materials. In addition, sugar alcohols are environment-friendly as they are produced in nature.

The alkyd polymer composition exhibits a dry-hard time of less than 10 hours when tested with metal driers according to ASTM D1640-03 test method (ASTM International, West Conshohocken, Pa.). Alternatively, the dry-hard time is less than 4 hours.

The alkyd polymer composition also exhibits a Gardner-Holdt viscosity with 30 wt. % mineral spirits at 25° C. that is less than or equal to Z4. Alternatively, the Gardner-Holdt viscosity with 30 weight % mineral spirits at 25° C. is greater than or equal to Z2. Alternatively, the Gardner-Holdt viscosity is between Z and Z2. The Gardner-Holt viscosity for the alkyd polymer composition may be obtained according to ASTM 1545-07 and ASTM 1725-04 (ASTM International, West Conshohocken, Pa.). The conversion of Gardner-Holdt viscosity to centipoise or other viscosity units is possible through the use of standard conversion charts.

The alkyd polymer composition further exhibits a clear appearance. For the purpose of this disclosure, the term "clear appearance" means that the material transmits 20% or more of impinging visible light having a wavelength of 540 nm. The transmittance of visible light having a 540 nm wavelength may be measured via any conventional spectrophotometry method.

The alkyd polymer composition is formulated, such that it comprises about 15 to 75 wt. % of fatty acids, about 5 to 35 wt. % of sugar alcohols with six carbons, about 2 to 10 wt. % of a polyol with four or more hydroxyl functional groups, and about 5 to 25 wt. % of an aromatic polyacid with two or more carboxylic groups located in a meta position relative to each other.

The alkyd polymer composition may be organic solvent soluble and have a number average molecular weight in the range of 500 to 100,000 Daltons. Alternatively, the number average molecular weight of the polymeric adduct is between about 1,000 and 50,000 Daltons; alternatively, between about 1,500 and about 10,000 Daltons.

The fatty acids may be unsaturated, saturated, or a mixture thereof. Exemplary fatty acids include, but are not limited to, dehydrated castor oil fatty acid, soybean oil fatty acid, tall oil fatty acid, sunflower fatty acid, coconut fatty acid, castor oil fatty acid, linseed oil fatty acid, tung oil fatty acid, safflower fatty acid, lineloic acid, or a mixture thereof. Alternatively, the fatty acids include dehydrated castor oil fatty acid or soybean oil fatty acid.

Sugar alcohols with six carbon atoms tend to form five-membered ring structures during the alkyd polymerization through a dehydration reaction between the hydroxyl functional groups in the same sugar alcohol. Referring now to FIG. 1, subjecting sorbitol to heat for a predetermined amount of time leads to dehydration resulting in the formation of water and sorbitan, represented by a single ring structure. Upon further heating, the sorbitan structure undergoes further dehydration to form water and isosorbide, which is represented by a two ring structure. A further description of the effect of heating sorbitol is provided in an article published by A. Yamaguchi, et al. in *Green Chemistry*, 13, 873-881 (2011), the entire contents of which are hereby incorporated by reference.

Figure 2B:
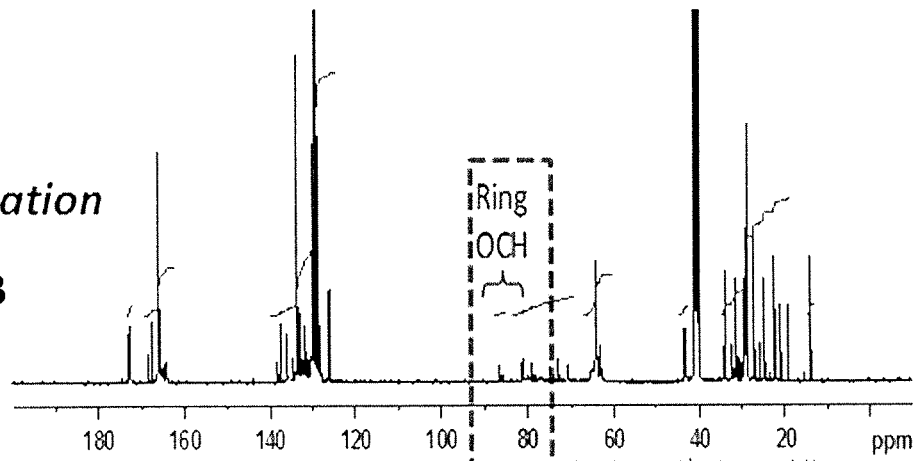
FIGS. 2A and 2B are $C^{13}$ Nuclear Magnetic Resonance (NMR) spectra measured before (FIG. 2A) and after (FIG. 2B) polymerization of an alkyd polymer composition formed according to the teachings of the present disclosure using 8.7 wt. % sorbitol.
Figure 2A:
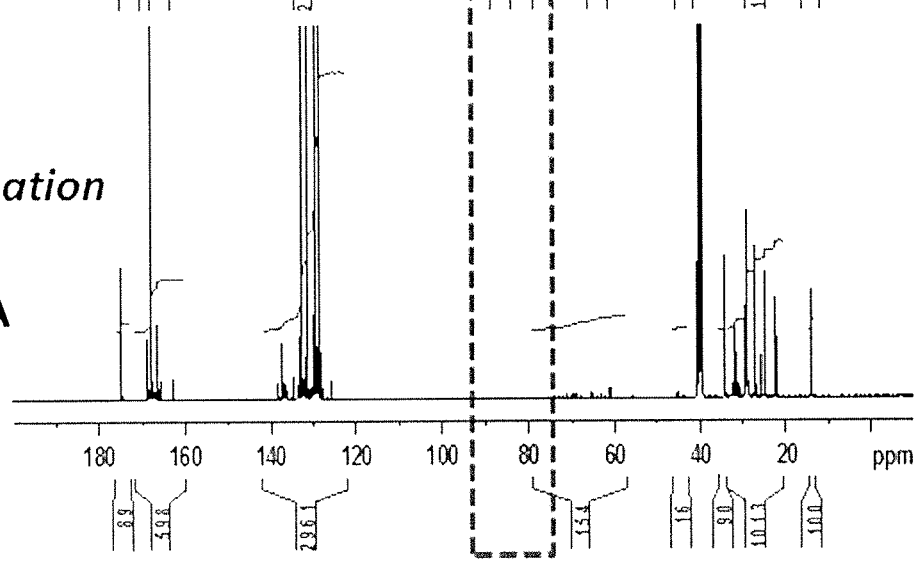

The presence of at least one aliphatic oxide ring structure in the alkyd polymer may be determined by the presence of peaks or signals located between 75 to 90 ppm measured using carbon-13 ($C^{13}$) Nuclear Magnetic Resonance (NMR) spectroscopy. Referring now to FIGS. 2A and 2B, the C13 NMR spectrum measured for an alkyd polymer composition containing 8.7 wt. % sorbitol starting reagent before and after polymerization is provided. Prior to polymerization, the sorbitol starting reagent (see FIG. 2A) exhibits peaks or signals that are less than 75 ppm. In other words, the starting reagents for the alkyd polymer composition formed according to the teachings of the present disclosure do not exhibit any peaks or signals between 75 to 90 ppm. However, after being allowed to undergo polymerization (see FIG. 2B), the resulting alkyd polymer composition exhibits peaks between 75 to 90 ppm, which indicate the presence of ring structures in the polymer backbone. Sorbitan (single ring) structure exhibits peaks in the range of 75 ppm to about 85 ppm, while isosorbide (double ring) structure exhibits peaks that are greater than 85 ppm; alternatively, between about 85 ppm and 90 ppm.

Figure 3:
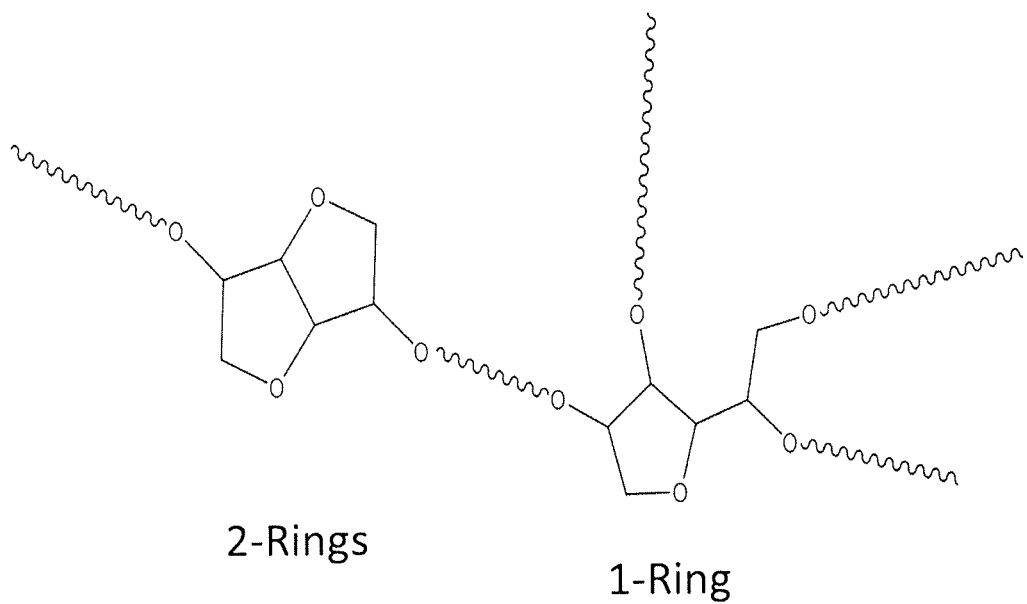
FIG. 3 is a schematic representation of ring structures that may be incorporated into the backbone of the alkyd polymer in the composition formed in FIG. 2B.

Referring now to FIG. 3, a single specific example is shown, without limitation, of the type of single and double ring structures that are incorporated into the backbone of the alkyd polymer chain in the composition formed according to the teachings of the present disclosure. Without being bound by theory, the ring structure in the alkyd polymer main chain is believed to be responsible for the fast dry-hard time associated with the alkyd polymer composition. Several examples of a sugar alcohol with six carbon atoms include, but are not limited to, fucitol, galactitol, iditol, inositol, mannitol, sorbitol, or combinations thereof. Alternatively, the sugar alcohol is sorbitol.

Examples of a polyol with four or more hydroxyl functional groups include without limitation, pentaerythritol, di-pentaerythritol, or a mixture thereof. Alternatively, the polyol is pentaerythritol.

Examples of an aromatic polyacid with at least two carboxylic groups located in the meta-position relative to one another include, but are not limited to, isophthalic acid, trimellitic anhydride, trimellitic acid, 5-(sodiosulfo)-isophthalic acid, pyromellitic dianhydride, or a mixture thereof. Alternatively, the aromatic polyacid is isophthalic acid.

When desirable, the alkyd polymer composition may be modified by further comprising, as part of the polymerized units, one or more acrylic polymers, vinyl polymers, or mixtures thereof. The incorporation of such acrylic or vinyl polymers can enhance the dry time and/or other coating properties. The modification of the alkyd polymer composition may be accomplished by a radical polymerization of ethylenenically unsaturated vinyl or (meth) acrylate monomers at a reaction temperatures between about 100° C. and 200° C. in the presence of the alkyd polymer composition with an initiator, including, but are not limited to, 2,2-azobisisobutyronitrile, 1,1-azobiscyclohexane carbonitrile, t-butyl peroxy benzoate, t-butyl peroctoate, di-t-amyl peroxide, di-t-butyl peroxide, t-butyl peroxybenzoate, benzoyl peroxide, or a mixture thereof.

The alkyd polymer composition may be diluted with organic carrier in order to achieve the optimum viscosity for coating application. The organic carrier may be selected from the group comprising or consisting of drying oils, organic solvents, varnishes, laquers, resin solutions, enamels, or oil-based paints. Several examples of an organic solvent, include, but are not limited to, mineral spirits, naphtha, methyl amyl ketone, xylene, toluene, methyl isobutyl ketone, ethyl acetate, diethylene glycol monobutyl ether acetate, ethylene glycol monobutyl ether acetate, dipropylene glycol monobutyl ether acetate, propylene glycol monobutyl ether acetate, ethylene glycol monobutyl ether, isobutyl acetate, n-propyl acetate, ethylene glycol monopropyl ether, ethyl 3-ethoxypropionate, n-butyl propionate, dipropylene glycol monobutyl ether, triethylene glycol monobutyl ether, methyl isoamyl ketone, oxo-hexyl acetate, tripropylene glycol monomethyl ether, aromatic hydrocarbon, prpylne gly phenyl ether, diethylene glycol monomethyl ether, diethylene glycol monoethyl ether acetate, isophorone, methyl propyl ketone, n-butyl acetate, propylene glycol monomethyl ether, para-chlorobenzotrifluoride, acetone, dimethyl carbonate, t-butylacetate or a mixture thereof. Alternatively, the organic solvent is mineral spirits and/or xylene, methyl amyl ketone. Any organic solvent that remains in the final alkyd polymer composition at the end of the synthesis process may be removed, if desirable, using an conventional method, such as subjecting the composition to vacuum distillation, by heating the product at a temperature that is higher than the boiling point of the solvent, or by using a combination of both.

The alkyd polymer composition may be prepared using conventional polymerization techniques. For example, the reagents that will form the polymerized units in the alkyd polymer composition may be charged into a reactor. Once the reagents are charged into the reactor, the mixture is heated to a temperature that is between about 200° C. and 300° C. This temperature is maintained until the alkyd polymer has an acid value below typically 35 as determined according to ASTM test method D1639 (ASTM International, West Conshohocken, Pa.). Alternatively, the reaction temperature may be between about 210° C. and 270° C.; alternatively, between about 210° C. and 250° C.; alternatively, about 210° C., 220° C., 230° C., or 240° C. One of ordinary skill in the art will also understand that the reagents may be added to the reaction container simultaneously or consecutively. One of ordinary skill in the art will further understand that the temperature may be reduced below the reaction temperature (i.e., below 200° C.) and then increased again to the reaction temperature during the course of the reaction for various purposes (for example, to add another reagent or for intermediate reactions to occur).

According to another aspect of the present disclosure, the alkyd polymer composition may be used in a variety of product formulations. These product formulations may be designed for use, without limitation, as coatings, paints, adhesives, sealants, or inks. The product formulations may be further modified by the addition of one or more additives, including without limitation additional polymers, pigments or colorants, fillers, dispersants or surfactants, plasticizers, defoamers, thickeners, biocides, solvents, rheology modifiers, wetting or spreading agents, leveling agents, conductive additives, thermal insulating filler, adhesion promoters, anti-blocking agents, anti-cratering agents or anti-crawling agents, corrosion inhibitors, anti-static agents, flame retardants, optical brighteners, UV absorbers or other light stabilizers, chelating agents, cross-linking agents, flattening agents, flocculants, humectants, insecticides, lubricants, odorants, oils, waxes or anti-slip aids, soil repellants, and stain resistant agents. Useful cross-linking agents include, but are not limited to multi-functional isocyanates, melamine resins, and mixtures thereof.

The product formulations may be applied by conventional techniques, such as dipping, brushing, flowing, or spraying to name a few, onto a variety of substrate surfaces. The substrates may include without limitation, wood, fabricated wood, paper, cardboard, textiles, synthetic resins, ceramics, ferrous metals, non-ferrous metals, stone, concrete, plaster, and the like.

The product formulation may be used in an indoor or outdoor application. Outdoor applications may include, without limitation, metal coating applications. Additional outdoor applications may include, but not be limited to, rail car coating, agricultural machinery coating, automobile parts coating, log cabin coatings and deck stains. The alkyd polymer composition in the product formulation formed thereof may provide coatings for automotive, industrial, construction and residential housing applications, including for example, without limitation, wood stains, porch and deck stains, glossy top coats, traffic paints, general metal coatings, kitchen cabinetry coatings, automobile refinish, lawn and garden equipment coatings, bus and truck top coatings, gloss trim enamels, metal primers, light duty maintenance coatings, furniture coatings, stain blocking coatings, appliance coatings, dumpster coatings, heavy duty equipment coatings, industrial equipment coatings, and sash and trim enamels. The product formulations may also be useful for adhesive and ink applications.

According to another aspect of the present disclosure, a method of using a product formulation that includes the alkyd polymer composition as described above and further defined herein is provided. This method generally comprises, consists of, or consists essentially of providing the product formulation; applying the product formulation to the surface of a substrate; and allowing the product formulation to dry and adhere to the surface of the substrate. The product formulation exhibits a Gardner-Holdt viscosity at 25° C. of lower than Z4 and a dry-hard time of less than 10 hours when tested according to ASTM D1640-03 (ASTM International, West Conshohocken, Pa.). The product formulation may be applied to the surface of the substrate using one or more processes including without limitation, dip coating, brush or roller coating, flow coating, curtain coating, ink jet, streaming, or spray coating. The substrate upon which the product formulation is applied may include, but not be limited to natural wood, fabricated wood, paper, cardboard, textiles, synthetic resins, ceramics, ferrous metals, non-ferrous metals, stone, concrete, blacktop, glass, plaster, or a mixture thereof.

Other Embodiments of the Invention

1. An alkyd polymer composition for use in low volatile organic compound (VOC) containing products, the alkyd polymer composition comprising, as polymerized units an alkyd polymer of:
   15 to 75 wt. % of one or more fatty acids;
   5 to 35 wt. % of a sugar alcohol having at least 6 carbon atoms;
   2 to 10 wt. % of a polyol with four or more hydroxyl functional groups; and
   5 to 25 wt. % of an aromatic polyacid with at least two carboxylic acid groups located in a meta-position relative to one another;
   wherein the alkyd polymer composition has a Gardner-Holt viscosity with 30 weight % mineral spirits at 25° C. that is less than or equal to Z4, a dry-hard time of less than 10 hours when tested with metal driers according to ASTM D1640-03, and a clear appearance.

2. The alkyd polymer composition according to claim 1, wherein the alkyd polymer composition comprises at least one aliphatic oxide ring having one or more peaks located between 75 to 90 ppm measured using $C^{13}$ Nuclear Magnetic Resonance (NMR) spectroscopy.

3. The alkyd polymer composition according to any of claim 1 or 2, wherein the sugar alcohol is fucitol, galactitol, iditol, inositol, mannitol, sorbitol, or a combination thereof; and the fatty acid is unsaturated, saturated, or a mixture thereof.

4. The alkyd polymer composition according to any of claims 1-3, wherein the dry-hard time is less than 4 hours;
   wherein the alkyd polymer composition has a number average molecular weight between 500 and 100.000 Daltons;
   wherein the Gardner-Holt viscosity with 30 weight % mineral spirits at 25° C. is greater than or equal to Z2.

5. The alkyd polymer composition according to any of claims 1-4, wherein the fatty acid is dehydrated castor oil fatty acid, soybean oil fatty acid, tall oil fatty acid, sunflower fatty acid, coconut fatty acid, castor oil fatty acid, linseed oil fatty acid, tung oil fatty acid, safflower fatty acid, lineloic acid, or a mixture thereof.

6. The alkyd polymer composition according to any of claims 1-5, wherein the polyol with four or more hydroxyl functional groups is pentaerythitrol, dipentaerythritol, or a mixture thereof.

7. The alkyd polymer composition according to any of claims 1-6, wherein the aromatic polyacid with at least two carboxylic acid groups located in the meta-position relative to one another is isophthalic acid, trimellitic anhydride, trimellitic acid, 5-(sodiosulfo)-isophthalic acid, pyromellitic dianhydride, or a mixture thereof.

8. The alkyd polymer composition according to any of claims 1-7, wherein the alkyd polymer composition further comprises, as part of the polymerized units, one or more acrylic polymers, vinyl polymers, or mixtures thereof.

9. The alkyd polymer composition according to any of claims 1-8, wherein the composition further comprises an organic carrier selected from the group consisting of a drying oil, an organic solvent, a varnish, a lacquer, a resin solution, an enamel, or an oil-based paint;
wherein the organic solvent is selected from the group consisting of mineral spirits, naphtha, methyl amyl ketone, xylene, toluene, methyl isobutyl ketone, ethyl acetate, diethylene glycol monobutyl ether acetate, ethylene glycol monobutyl ether acetate, dipropylene glycol monobutyl ether acetate, propylene glycol monobutyl ether acetate, ethylene glycol monobutyl ether, isobutyl acetate, n-propyl acetate, ethylene glycol monopropyl ether, ethyl 3-ethoxypropionate, n-butyl propionate, dipropylene glycol monobutyl ether, triethylene glycol monobutyl ether, methyl isoamyl ketone, oxo-hexyl acetate, tripropylene glycol monomethyl ether, aromatic hydrocarbon, prpylne gly phenyl ether, diethylene glycol monomethyl ether, diethylene glycol monoethyl ether acetate, isophorone, methyl propyl ketone, n-butyl acetate, propylene glycol monomethyl ether, para-chlorobenzotrifluoride, acetone, dimethyl carbonate, t-butylacetate or a mixture thereof.

10. A product formulation for use as a coating, a paint, an adhesive, a sealant, or an ink, the product formulation comprising the alkyd polymer composition according to any of claims 1-9;
wherein the product formulation is used outdoors or indoors in a transportation application, an industrial application, a construction application, or a residential application.

11. The product formulation according to claim 11, wherein the product formulation further comprises one or more additives selected from the group of additional polymers, pigments or colorants, fillers, dispersants or surfactants, plasticizers, defoamers, thickeners, biocides, solvents, rheology modifiers, wetting or spreading agents, leveling agents, conductive additives, adhesion promoters, anti-blocking agents, anti-cratering agents or anti-crawling agents, corrosion inhibitors, thermal insulating fillers, antistatic agents, flame retardants, optical brighteners, UV absorbers or other light stabilizers, chelating agents, crosslinking agents, flattening agents, flocculants, humectants, insecticides, lubricants, odorants, oils, waxes or anti-slip aids, soil repellants, and stain resistant agents.

12. The product formulation according to any of claim 10 or 11, wherein the product formulation is selected as one from the group of a general metal coating, rail car coating, agricultural machinery coating, automobile parts coating, log cabin coating, wood stain, porch or deck stain, glossy topcoat, traffic paint, kitchen cabinetry coating, automobile refinish, lawn & garden equipment coating, bus and truck top coating, gloss trim enamel, metal primer, light duty maintenance coating, furniture coating, stain blocking coating, appliance coating, dumpster coating, heavy duty equipment coating, industrial equipment coating, and sash and trim enamel.

13. A method of using a product formulation, wherein the method comprises:
providing the product formulation according to any of claims 10-12;
applying the product formulation to the surface of a substrate; and
allowing the product formulation to dry and adhere to the surface of the substrate;
wherein the product formulation exhibits a Gardner-Holt viscosity at 25° C. that ranges from about Z2 to Z4 and a dry-hard time of less than 4 hours when tested according to ASTM D1640-03.

14. The method according to claim 13, wherein the product formulation is applied to the surface of the substrate using one or more processes selected from the group of dip coating, brush or roller coating, flow coating, curtain coating, ink jet, streaming, or spray coating.

15. The method according to any of claim 14 or 15, wherein the substrate is selected as one from the group of natural wood, fabricated wood, paper, cardboard, textiles, synthetic resins, ceramics, ferrous metals, non-ferrous metals, stone, concrete, blacktop, glass, plaster, or a mixture thereof.

The following specific examples are given to illustrate the alkyd polymer compositions, as well as the products formed therefrom and methods of preparing the same, and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

EXAMPLE 1—SYNTHESIS OF ALKYD POLYMER COMPOSITIONS

In order to establish a baseline for a comparable alkyd polymer composition, five comparative alkyd polymer compositions (Run No.'s C-1 to C-5) were formed, wherein the alkyd polymer composition did not contain one or more of a sugar alcohol with six carbons, a polyol with four or more hydroxyl functional groups, and/or an aromatic polyacid with at least two carboxylic groups located in the meta-position relative to one another, as defined for the alkyd polymer compositions of the present disclosure. The composition of the alkyd polymer in each of the comparative examples (Run No.'s C-1 to C-5) is provided in Table 1 below in comparison with an alkyd polymer composition (Run No. R-1) prepared according to the teachings of the present disclosure.

Comparative Example C-1—Alkyd polymer synthesis was accomplished with sorbitol, but without a polyol having four or more hydroxyl functional groups and an aromatic polyacid with at least two carboxylic groups located in the meta-position to each other. Rather in this Comparative Example C-1, the polyacid included two carboxylic groups located in the ortho-position relative to one another (see Table 1). The amount of reagent combined into Charge (A) that was used in forming the alkyd polymer composition is provided in Table 2 below.

TABLE 1

Comparison of Polymerized Units in Alkyd Polymer Compositions.

| Run No. | Sorbitol | Polyol with four or more hydroxyl functional groups | Aromatic Acid with two carboxylic groups located in the ortho-position relative to each other | Aromatic Acid with two carboxylic groups located in the meta-position relative to each other | Aromatic Acid with two carboxylic groups located in the para-position relative to each other |
|---|---|---|---|---|---|
| C-1 | ✓ |   | ✓ |   |   |
| C-2 | ✓ | ✓ | ✓ |   |   |
| C-3 | ✓ | ✓ |   |   | ✓ |
| C-4 | ✓ |   |   | ✓ |   |
| C-5 |   | ✓ |   | ✓ |   |
| R-1 | ✓ | ✓ |   | ✓ |   |

Charge (A) was added into a flask equipped with a receiver, a cold water condenser, and a nitrogen blanket. More methyl amyl ketone was added during the polymerization to facilitate the removal of water and clean the sublimed raw materials from inside the flask. The temperature was raised to 240° C. and maintained throughout the polymerization. The formed water was continuously removed from a flask. The progress of the polymerization was monitored by the acid value. The polymerization was stopped when the acid value of the neat sample was below 25.0. The resulting product has the acid value on the polymer solids of 18.86, and, when diluted with mineral spirits to 80% NVM (non-volatile material), clear appearance and a Gardner Holt viscosity of "J+".

TABLE 2

Composition of Comparative Example C-1

| Charge | Material | Grams |
|---|---|---|
| (A) | Sorbitol | 174 |
|  | Dehydrated castor fatty acid | 174 |
|  | Soybean oil fatty acid | 328 |
|  | Benzoic acid | 25 |
|  | Phthalic anhydride | 116 |
|  | Methyl amyl ketone | 20 |

Comparative Example C-2—Alkyd polymer synthesis was accomplished with sorbitol and a polyol with four hydroxyl functional groups but without using an aromatic polyacid having at least two carboxylic groups located in the meta-position relative to one another. Rather in this Comparative Example C-2, the polyacid included two carboxylic groups located in the ortho-position relative to one another (see Table 1). The amount of reagent combined into Charge (A) that was used in forming the alkyd polymer composition is provided in Table 3 below.

TABLE 3

Composition of Comparative Example C-2.

| Charge | Material | Grams |
|---|---|---|
| (A) | Sorbitol | 147 |
|  | Pentaerythritol | 30 |
|  | Dehydrated castor fatty acid | 174 |
|  | Soybean oil fatty acid | 328 |
|  | Benzoic acid | 25 |
|  | Phthalic anhydride | 116 |
|  | Methyl amyl ketone | 20 |
| (B) | Mineral spirits | 80 |

Charge (A) was added into a flask equipped with a receiver, a cold water condenser, and nitrogen blanket. More methyl amyl ketone was added during the polymerization to facilitate the removal of water and clean the sublimed raw materials from inside the flask. The temperature was raised to 240° C. and maintained throughout the polymerization. The formed water was continuously removed from a flask. The progress of the polymerization was monitored by the acid value. The polymerization was stopped when the acid value of the neat sample was below 25.0. The temperature was cooled below 150° C. before Charge (B) was added into a flask. The resulting product has the acid value on the polymer solids of 20.2, and, when diluted with mineral spirits to 80% NVM (non-volatile material), a clear appearance and a Gardner Holdt viscosity of "P–".

Comparative Example C-3—Alkyd polymer synthesis was accomplished with sorbitol and a polyol with four hydroxyl functional groups but without using an aromatic polyacid having at least two carboxylic groups located in the meta-position relative to one another (see Table 1). Rather in this Comparative Example C-3, the polyacid included two carboxylic groups located in the para-position relative to one another. The amount of reagent combined into Charge (A) that was used in forming the alkyd polymer composition is provided in Table 4 below.

TABLE 4

Composition of Comparative Example C-3.

| Charge | Material | Grams |
|---|---|---|
| (A) | Sorbitol | 147 |
|  | Pentaerythritol | 30 |
|  | Dehydrated castor fatty acid | 174 |
|  | Soybean oil fatty acid | 328 |
|  | Benzoic acid | 25 |
|  | Terephthalic acid | 116 |
|  | Methyl amyl ketone | 20 |

Charge (A) was added into a flask equipped with a receiver, a cold water condenser, and a nitrogen blanket. More methyl amyl ketone was added during the polymerization to facilitate the removal of water and clean the sublimed raw materials from inside the flask. The temperature was raised to 240° C. and maintained throughout the polymerization. The formed water was continuously removed from a flask. The process was aborted as the products remained turbid despite the extended heating at 240° C. due to incomplete reaction of terephthalic acid into the alkyd polymer.

Comparative Example C-4—Alkyd polymer synthesis was accomplished with sorbitol and an aromatic polyacid with two carboxylic groups located in the meta-position to each other, but without a polyol with four or more hydroxyl functional groups (see Table 1). The amount of reagent combined into Charge (A) that was used in forming the alkyd polymer composition is provided in Table 5 below.

TABLE 5

Composition of Comparative Example C-4.

| Charge | Material | Grams |
|---|---|---|
| (A) | Sorbitol | 174 |
| | Dehydrated castor fatty acid | 174 |
| | Soybean oil fatty acid | 328 |
| | Benzoic acid | 25 |
| | Isophthalic acid | 130 |
| | Methyl amyl ketone | 20 |

Charge (A) was added into a flask equipped with a receiver, a cold water condenser, and a nitrogen blanket. More methyl amyl ketone was added during the polymerization to facilitate the removal of water and clean the sublimed raw materials from inside the flask. The temperature was raised to 240° C. and maintained throughout the polymerization. The formed water was continuously removed from a flask. The progress of the polymerization was monitored by the acid value. The polymerization was stopped when the acid value does not show any significant decrease upon further heating. The resulting product has the acid value on the polymer solids of 45.8, and, when diluted with mineral spirits to 80% NVM (non-volatile material), turbid appearance and a Gardner Holdt viscosity of "T-U"

Comparative Example C-5—Alkyd polymer synthesis was accomplished with a polyol having four hydroxyl functional groups and an aromatic polyacid with two carboxylic groups located in the meta-position relative to each other, but without sorbitol (see Table 1). The amount of reagent combined into Charge (A) that was used in forming the alkyd polymer composition is provided in Table 6 below.

TABLE 6

Composition of Comparative Example C-5.

| Charge | Material | Grams |
|---|---|---|
| (A) | Pentaerythritol | 176 |
| | Dehydrated castor fatty acid | 174 |
| | Soybean oil fatty acid | 328 |
| | Benzoic acid | 25 |
| | Isophthalic acid | 145 |
| | Methyl amyl ketone | 20 |

Charge (A) was added into a flask equipped with a receiver, a cold water condenser, and a nitrogen blanket. More methyl amyl ketone was added during the polymerization to facilitate the removal of water and clean the sublimed raw materials from inside the flask. The temperature was raised to 240° C. and maintained throughout the polymerization. The formed water was continuously removed from a flask. The progress of the polymerization was monitored by the acid value. The polymerization was stopped when the acid value of the neat sample was below 5.0. The resulting product has the acid value on the polymer solids of 1.5 and, when diluted with mineral spirits to 80% NVM (non-volatile material), a clear appearance, and a Gardner Holdt viscosity of Z3

Example R-1—An alkyd polymer composition was synthesized according to the teachings of the present disclosure using sorbitol, a polyol with four hydroxyl functional groups, and an aromatic polyacid with two carboxylic groups located in the meta-position relative to each other (see Table 1). The amount of reagent combined into Charge (A) that was used in forming the alkyd polymer composition is provided in Table 7 below.

TABLE 7

Composition of Example R-1.

| Charge | Material | Grams |
|---|---|---|
| (A) | Pentaerythritol | 60 |
| | Sorbitol | 294 |
| | Dehydrated castor fatty acid | 348 |
| | Soybeanoil fatty acid | 655 |
| | Benzoic acid | 50 |
| | Isophthalic acid | 260 |
| | Methyl amyl ketone | 40 |
| (B) | Mineral spirits | 180 |

Charge (A) was added into a flask equipped with a receiver, a cold water condenser, and a nitrogen blanket. More methyl amyl ketone was added during the polymerization to facilitate the removal of water and clean the sublimed raw materials from inside the flask. The temperature was raised to 250° C. and maintained throughout the polymerization. The formed water was continuously removed from a flask. The progress of the polymerization was monitored by the acid value. The polymerization was stopped when the acid value of the neat sample was below 20.0. The temperature was cooled below 150° C. before Charge (B) was added into a flask. The resulting product has the NVM (Non-Volatile Material) has 88.4, and the acid value on the polymer solids of 16.4 and, when diluted with mineral spirits to 80% NVM (non-volatile material), a clear appearance, and Gardner Holdt viscosity of "Z2+".

EXAMPLE 2—PROPERTY MEASUREMENT

A drier package was prepared with 8.7 grams of 5% Calcium Hydro-CEM®, 2.6 grams of 10% Cobalt Hex-Cem® and 7.3 grams of 12% Zirconium Hydro-CEM® (OMG Americas Inc., Westlake, Ohio). The drier package was mixed with an alkyd polymer solution of 70 NVM in mineral spirits with the amount of 0.5 wt. % based on the overall polymer solids. The film was cast on a glass plate with a bar film applicator with 3 wet mil thickness. Dry-hard was measured according to ASTM D1640 test method at ambient condition. A summary of the measured data for dry time and viscosity is provided in Table 8 below.

TABLE 8

Dry-Hard Time and Viscosity Measurements.

| | C-1 | C-2 | C-3 | C-4 | C-5 | R-1 |
|---|---|---|---|---|---|---|
| Dry-Hard Time (hours) according to ASTM D-1640 | 16 | 13 | Not tested due to poor polymer quality | 14 | 15 | 3.5 |
| Gardner-Holdt Viscosity at 80 NVM in mineral spirits | J+ | P– | Not tested due to poor polymer quality | T-U | Z3 | Z2+ |
| Conversion of Gardner-Holdt viscosity to centipoise | ~275 | ~370 | Not tested due to | ~550 to ~630 | ~4,630 | >3,620 |

TABLE 8-continued

Dry-Hard Time and Viscosity Measurements.

|  | C-1 | C-2 | C-3 | C-4 | C-5 | R-1 |
|---|---|---|---|---|---|---|
| Appearance at 80 NVM in mineral spirits | Clear | Clear | poor polymer quality Turbid | Turbid | Clear | Clear |

This example demonstrates that the alkyd polymer composition of the present disclosure (Run No. R-1) can be used to form a product that meets or exceeds (1) shorter than 10 hour dry-hard time measured by the ASTM D1640 test method; (2) a clear appearance; and (3) less than a Z4 Gardner Holdt viscosity when diluted to 80 NVM (non-volatile material) with mineral spirits. The alkyd polymer composition (R-1) surprisingly shows the combined desirable properties of surface dry and low viscosity in an organic solvent, such as mineral spirits. This confirms that the alkyd polymer composition of the present disclosure may be readily used to prepare low VOC coatings, which require less amount of organic solvents to achieve the desired application viscosity and exhibits a fast surface dry-time.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An alkyd polymer consisting of, as polymerized units:
   15 to 75 wt. % of one or more fatty acids selected from the group consisting of dehydrated castor oil fatty acid, soybean oil fatty acid, tall oil fatty acid, sunflower fatty acid, coconut fatty acid, castor oil fatty acid, linseed oil fatty acid, tung oil fatty acid, safflower fatty acid, lineloic acid, and mixtures thereof;
   5 to 35 wt. % of a sugar alcohol having at least 6 carbon atoms, wherein the sugar alcohol is one or more selected from the group consisting of fucitol, galactitol, iditol, inositol, mannitol, sorbitol, and a combination thereof;
   2 to 10 wt. % of a polyol with four or more hydroxyl functional groups selected from the group consisting of pentaerythitrol, dipentaerythritol, and mixtures thereof;
   a monocarboxylic acid; and
   5 to 25 wt. % of one or more aromatic polyacid with at least two carboxylic acid groups located in a meta-position relative to one another selected from the group consisting of isophthalic acid, trimellitic anhydride, trimellitic acid, 5-(sodiosulfo)-isophthalic acid, pyromellitic dianhydride, and a mixture thereof;
   optionally further including as part of the polymerized units, one or more acrylic polymers, vinyl polymers, or mixtures thereof, obtained by radical polymerization of ethylenically unsaturated (meth)acrylate or vinyl monomers in the presence of the alkyd polymer and a radical initiator;
   wherein the alkyd polymer comprises at least one aliphatic oxide ring having one or more peaks located between 75 to 90 ppm measured using $C^{13}$ Nuclear Magnetic Resonance (NMR) spectroscopy; and
   wherein the alkyd polymer has a Gardner-Holdt viscosity with 30 weight % mineral spirits at 25° C. that is less than or equal to Z4, a dry-hard time of less than 10 hours when tested with metal driers according to ASTM $D_{1640}$-03, and a clear appearance that transmits 20% or more of impinging visible light having a wavelength of 540 nm.

2. The alkyd polymer according to claim 1, wherein the dry-hard time is less than 4 hours.

3. The alkyd polymer according to claim 1, wherein the fatty acid is dehydrated castor oil fatty acid, soybean oil fatty acid, or a mixture thereof.

4. The alkyd polymer according to claim 1, wherein the polyol with four or more hydroxyl functional groups is pentaerythitrol.

5. The alkyd polymer according to claim 1, wherein the aromatic polyacid with at least two carboxylic acid groups located in the meta-position relative to one another is isophthalic acid.

6. The alkyd polymer according to claim 1, wherein the alkyd polymer has a number average molecular weight between 500 and 100,000 Daltons.

7. The alkyd polymer according to claim 1, wherein the Gardner-Holdt viscosity with 30 weight % mineral spirits at 25° C. is greater than or equal to Z2.

8. The alkyd polymer according to claim 1, wherein the alkyd polymer is diluted with an organic carrier selected from the group consisting of a drying oil, an organic solvent, a varnish, a lacquer, a resin solution, an enamel, and an oil-based paint.

9. The alkyd polymer according to claim 8, wherein the organic solvent is selected from the group consisting of mineral spirits, naphtha, methyl amyl ketone, xylene, toluene, methyl isobutyl ketone, ethyl acetate, diethylene glycol monobutyl ether acetate, ethylene glycol monobutyl ether acetate, dipropylene glycol monobutyl ether acetate, propylene glycol monobutyl ether acetate, ethylene glycol monobutyl ether, isobutyl acetate, n-propyl acetate, ethylene glycol monopropyl ether, ethyl 3-ethoxypropionate, n-butyl propionate, dipropylene glycol monobutyl ether, triethylene glycol monobutyl ether, methyl isoamyl ketone, oxo-hexyl acetate, tripropylene glycol monomethyl ether, aromatic hydrocarbon, propylene glycol phenyl ether, diethylene glycol monomethyl ether, diethylene glycol monoethyl ether acetate, isophorone, methyl propyl ketone, n-butyl acetate, propylene glycol monomethyl ether, para-chlorobenzotrifluoride, acetone, dimethyl carbonate, t-butylacetate and a mixture thereof.

10. A coating, a paint, an adhesive, a sealant, or an ink comprising the alkyd polymer according to claim 1.

11. The coating, paint, adhesive, sealant, or ink according to claim 10, further comprising one or more additives selected from the group of additional polymers, pigments, colorants, fillers, dispersants surfactants, plasticizers, defoamers, thickeners, biocides, solvents-, rheology modifiers, wetting agents, spreading agents, leveling agents, conductive additives, adhesion promoters, anti-blocking agents, anti-cratering agents, anti-crawling agents-, corrosion inhibitors, thermal insulating fillers, anti-static agents, flame retardants, optical brighteners, UV absorbers, light stabilizers, chelating agents, crosslinking agents, flattening agents, flocculants, humectants, insecticides, lubricants, odorants, oils, waxes anti-slip aids, soil repellants, or stain resistant agents.

12. The coating, paint, adhesive, sealant, or ink according to claim 10, selected from a metal coating, a rail car coating, an agricultural machinery coating, an automobile parts coating, a log cabin coating, a wood stain, a porch stain, a deck stain, a traffic paint, a kitchen cabinetry coating, an automobile refinish, a lawn equipment coating, a garden equipment coating, a bus top coating, a truck top coating, a metal primer, a furniture coating, a stain blocking coating, a appliance coating, or a dumpster coating.

13. The alkyd polymer of claim 1 wherein the product formulation exhibits a Gardner-Holt viscosity at 25° C. that ranges from about Z2 to Z4 and a dry-hard time of less than 4 hours when tested according to ASTM D1640-03.

14. The alkyd polymer of claim 1 wherein the fatty acid is dehydrated castor oil fatty acid, soybean oil fatty acid, or a mixture there; the polyol with four or more hydroxyl functional groups is pentaerythitrol; the aromatic polyacid with at least two carboxylic acid groups located in the meta-position relative to one another is isophthalic acid; and the sugar alcohol is sorbitol.

* * * * *